United States Patent [19]
Schenck

[11] 3,832,897
[45] Sept. 3, 1974

[54] STATIONARY DEVICE SENSITIVE TO TORQUE IN ROTATING SHAFTS

[76] Inventor: Cornelius W. Schenck, 72 School St., Keene, N.H. 03431

[22] Filed: Apr. 2, 1973

[21] Appl. No.: 346,811

[52] U.S. Cl.............................. 73/136 R, 73/141 A
[51] Int. Cl. .............................................. G01l 3/02
[58] Field of Search...... 73/133 R, 136 R, 144, 471, 73/462, 78, 141 A

[56] References Cited
UNITED STATES PATENTS
| | | | |
|---|---|---|---|
| 3,116,632 | 1/1964 | Lane | 73/78 |
| 3,132,519 | 5/1964 | Federn | 73/471 |
| 3,224,262 | 12/1965 | Shipley | 73/136 R |

Primary Examiner—Charles A. Ruehl
Attorney, Agent, or Firm—Diller, Brown, Ramik & Wight

[57] ABSTRACT

This disclosure relates to a stationary device for measuring stresses particularly in a rotating shaft comprising a housing, a bore in the housing, a ring-like member in the bore, a bearing assembly within the ring-like member, the bearing assembly having inner and outer races and anti-friction elements therebetween, a shaft mounted for rotation within the bearing assembly, transducer means between the bearing assembly and the housing for detecting forces caused by deflection of the shaft, and means for translating the detected deflection forces into the output torque of the shaft.

19 Claims, 8 Drawing Figures

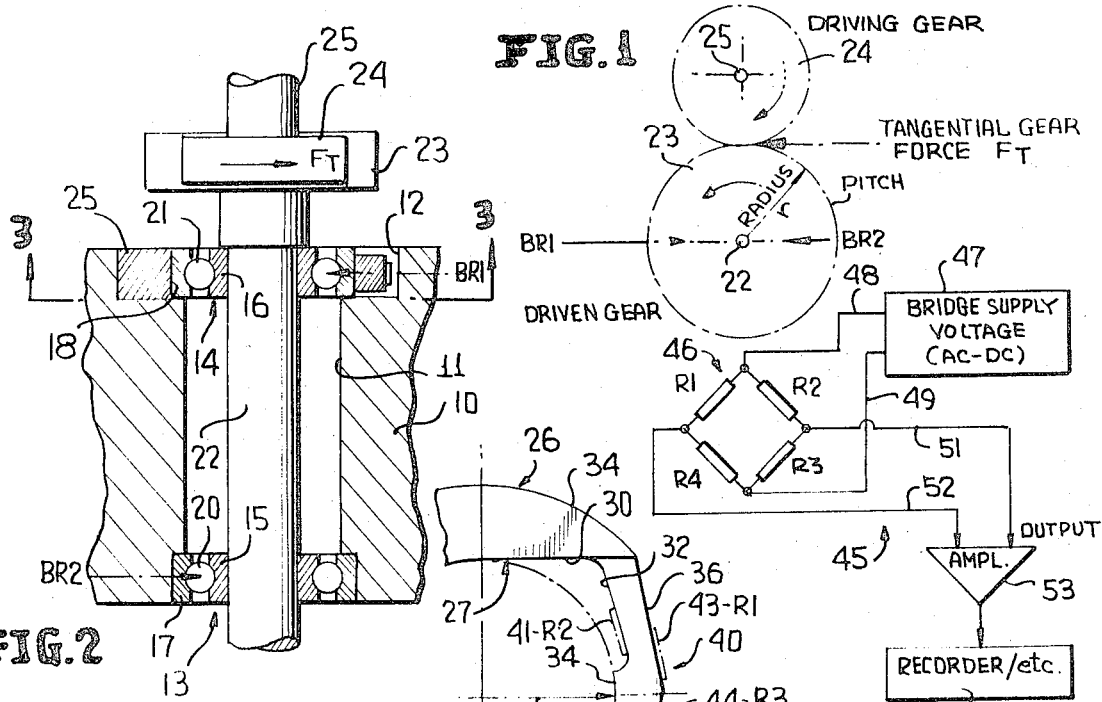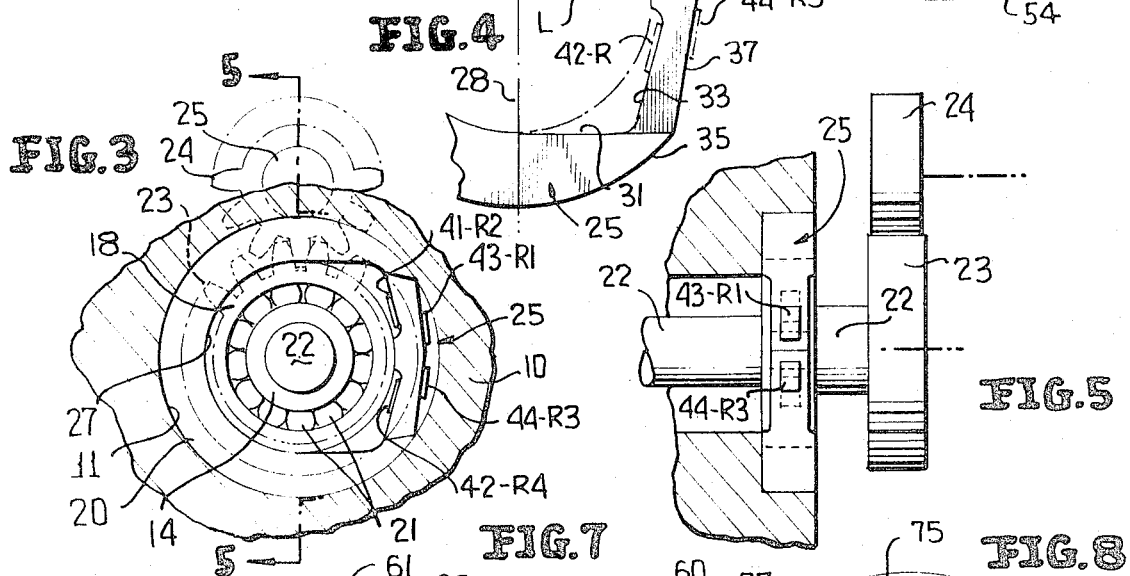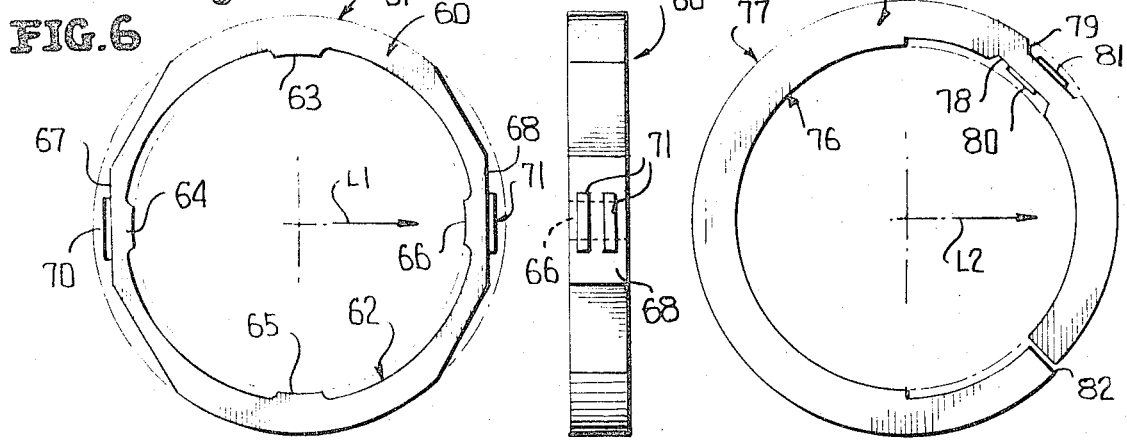

STATIONARY DEVICE SENSITIVE TO TORQUE IN ROTATING SHAFTS

The present invention is directed to a stationary device sensitive to torque in rotating shafts such that the output torque thereof can be detected and utilized, as found desirable or necessary.

It is conventional to measure the torsion in a rotating shaft by utilizing a transducer carried by the shaft in conjunction with slip-rings or the like and other appropriate equipment for picking up, amplifying, and/or recording electrical signals generated by the rotating transducer. Quite obviously, the latter described and similar prior art structure involves the use of burdensom equipment, is costlier that desired, and suffers from the lack of universal application without major modifications.

In keeping with the present invention it must be first appreciated that any rotating shaft will not only impart output torque to a desired mechanism, but will also indicate directly or indirectly to immediate structure the amount or degree of such torque. As an example, assuming that the shaft has keyed thereto a gear which is in mesh with a driving gear the tangential force between the gears will create reaction forces which will be transmitted through the shaft to associated bearing assemblies mounting the shaft for rotation within a machine housing. By interposing a force-responsive transducer between the bearing assembly and its housing it is possible to measure the reaction force which will be proportional to the torque transmitted to the shaft by the drive gear. Preferably the transducer is defined by at least a pair of strain gages which are mounted relative to the bearing assembly such that both tensile and compressive stresses created by the tangential force between the gears will be detected and measured to determine the transmitted torque. Preferably four strain gages are employed and connected in a Wheatstone bridge with the output thereof being proportional to the deflection of a ring-like member carrying the strain gages which in turn is proportional to the torque transmitted by the shaft. Preferably the four arms of the Wheatstone bridge will vary in resistance with two increasing and two decreasing as the ring-like member deflects in response to the forces imparted thereto by the rotating shaft.

With the above and other objects in view that will hereinafter appear, the nature of the invention will be more clearly understood by reference to the following detailed description, the appended claims and the several views illustrated in the accompanying drawing.

In the drawing:

FIG. 1 is a schematic view of the device of this invention for measuring torque of rotating shafts, and illustrates driving and driven gears, the latter of which is coupled to a shaft whose torque is detected by transducer means in the form of preferably four strain gages each of which defines an arm of Wheatstone bridge.

FIG. 2 is a fragmentary sectional view of a machine housing, and illustrates a bearing assembly mounting the shaft for rotation and being encircled by a ring-like member carrying a plurality of strain gages.

FIG. 3 is a sectional view taken generally along line 3—3 of FIG. 2, and illustrates the relative positions of the gears, the shaft, the ring-like member and the bearing assembly.

FIG. 4 is an enlarged fragmentary sectional view of the ring-like member of FIGS. 2 and 3, and illustrates the manner in which the same supports the strain gages upon interior and exterior peripheral surfaces thereof.

FIG. 5 is a sectional view taken generally along line 5—5 of FIG. 3, and illustrates further details of the housing, shaft, ring-like member and gears.

FIG. 6 is a side elevational view of another ring-like member, and illustrates four internal projections for mounting a bearing assembly therein and diametrically supported strain gages.

FIG. 7 is an elevational view of the ring-like member of FIG. 6 looking from right-to-left, and illustrates one of two pair of strain gages located at diametrically opposite sides of the ring-like member.

FIG. 8 is a front elevational view of another ring-like member, and illustrates the manner in which the same is slit for accommodation in bores of a housing as well as being recessed to accommodate strain gages on opposite interior and exterior peripheral surfaces thereof.

In keeping with the present invention a machine housing 10 is provided with a cylindrical bore 11 which is counterbored at 12 and has housed therewithin bearing assemblies 13, 14, each of which includes inner races 15, 16, outer races 17, 18, and anti-friction elements 20, 21, in the form of balls, rollers or the like.

A shaft 22 is journaled for rotation within the bearing assemblies 13, 14 and has keyed or otherwise secured thereto a gear 23 in mesh with and driven by a gear 24 keyed to a shaft 25 which is conventionally rotated by means (not shown) forming no part of this invention. As the driving gear 24 (FIG. 1) is rotated tangential forces between the gears 23, 24 create reaction forces at the bearing assemblies 13, 14 which when measured will be proportional to the torque of the shaft 22 and thus the latter can be accurately determined.

In order to measure the reaction force a ring-like member (FIG. 4), generally designated by the reference numeral 25, is interposed between the counterbore 12 and the outer race 18 of the bearing assembly 14. The ring-like member 25 is positioned as close to the gears 23, 24 as possible because the transverse reaction force from the shaft 22 to the bearing assembly 14 is greater than points remote therefrom as, for example, at the output end of the shaft 22 which is the lower end as viewed in FIG. 2.

The ring-like member 25 includes an exterior peripheral surface 26 and an interior peripheral surface 27 which to the left of the plane 28 in FIG. 4 is semi-cylindrical. To the right of the plane 28 in FIG. 4 the interior surface 27 includes two generally diametrically opposite tangential surfaces 30, 31 which merge with respective recesses 32, 33 sandwiching therebetween a projection 34 having an inboard rounded surface (unnumbered).

The exterior surface 26 to the left of the plane 28 is likewise semi-cylindrical and to the right thereof includes arcuate surface portions 34, 35 merging with respective flat or planar surfaces 36, 37.

Transducer means 40 in the form of conventional strain gages are mounted within the recesses 32, 33 and upon the flat surfaces 36, 37. The strain gages upon the surfaces of the recesses 32, 33 are designated by the reference numerals 41, 43 whereas the strain gages upon the flat surface portions 36, 37 are designated by the reference numerals 43, 44, respectively. The strain gages 41–44 are coupled to a circuit 45 with one of the four gages 41–44 forming one of the four respective resistant arms R1–R4 of a Wheatstone bridge 46 energized by a conventional and preferably variable power source 47 through conductors 48, 49. The output from the Wheatstone bridge 46 is conducted by conductors 51, 52 to an amplifier 53 which in turn is coupled to a recorder, monitor, computer, etc. 54.

The member 25 is conventionally held stationary within the counterbore 12 and sandwiched therewithin are the bearing assembly 14 and the shaft 22. Though the ring-like member 25 is constructed from metal the same is capable of deflecting, particularly the portion between the surfaces 30, 31 carrying the transducers or strain gages 41–44. As the shaft 22 rotates a load L (FIG. 4) will be impressed upon the ring-like member 25 with the result that the inner surfaces 32, 33 will be placed in compression and the outer surfaces 36, 37 will be placed in tension. The transducers 41, 42 corresponding to the resistances R2, R4 will detect the compressive forces whereas the transducers 43, 44 corresponding to the resistances R1, R3 will detect the tensile forces. As the stress or strain in the gages 41–44 change, the resistance thereof changes and since two will increase and two decrease, the gages are positioned in the adjacent legs of the Wheatstone bridge 46 such that the resistant changes have opposite signs. Accordingly the output will at all times be proportional to the torque of the shaft 22 and can be appropriately read out by conventional instrumentation, such as a computer 54. The output may then be utilized to, for example, control the particular operation utilizing the output torque of the shaft 22. The shaft 22 may at its output end carry a cutting blade, grinding wheel, etc., and to achieve precise and exacting tolerances minimum shaft deflection can be maintained and/or regulated by detecting the shaft torque and therefrom controlling the drive input to the mechanism (not shown) rotating the shaft 25 and the drive gear 24 keyed thereto.

While the preferred embodiment of the invention has been thus far described, it is within the scope of this invention to vary the particular configuration of the ring-like member 25 carrying the detecting means, transducers, or gages 41–44. As an example, reference is made to FIGS. 6 and 7 which illustrate another ring-like member, generally designated by the reference numeral 60, which includes an exterior peripheral surface 61 and an interior peripheral surface 62, the latter of which is generally cylindrical except for four inwardly directed projections 63–66 against which will rest the outer surface (unnumbered) of the outer race 18 of the bearing assembly 14 upon the substitution of the ring-like member 50 for the ring-like member 25. Diametrically opposite portions of the exterior surface 61 are flattened as at 67, 68 to accommodate upon each a pair of transducers 70, 71. The four transducers 70, 71 are likewise incorporated in the Wheatstone bridge 46 and upon the loading of the ring-like member 60 in the direction of the arrow L1 due to shaft deflection the read out from the circuit 45 will provide a proportional indication of the torque of the rotating shaft 22.

Another ring-like member 75 is shown in FIG. 8 and includes generally circular inner and outer surfaces 76, 77, respectively. The ring is slit radially as at 82 to permit the same to deflect inwardly for housing within the counterbore 12 which when inserted will rebound such that the exterior peripheral surface 77 will frictionally purchase against the peripheral surface (unnumbered) of the counterbore 12. As in the case of the ring-like members 25, 60 the ring-like member 75 includes an inner recess 78 and an outer recess 79 in each of which are a pair of transducers or strain gages 80, 81, respectively. The pair of transducers 80 and the pair of transducers 81 are incorporated in the Wheatstone bridge 46 of the circuitry 45 in order to obtain a read out proportional torque when the shaft deflects, as indicated by the headed arrow L2 in FIG. 8.

In any of the modifications the transmitted torque may be determined by the following formula:

$$\text{Transmitted Torque} = F_T \times r$$

or $$= (BR1 - BR2) \times r$$

WHERE $F_T$ is The Tangential Gear Force
$r$ is the pitch radius
$BR1$ and $BR2$ are the Reaction forces of the bearing assemblies
Since $BR1$ is Proportional to $BR2$
The Torque is simply $$KBR1$$

WHERE $K$ is a constant depending upon the Geometry of the system

While preferred forms and arrangement of parts have been shown in illustrating the invention, it is to be clearly understood that various changes in details and arrangement of parts may be made without departing from the scope and spirit of the disclosure.

I claim:

1. A stationary device for measuring stresses particularly in a rotating shaft comprising a housing, a bore in said housing, a bearing assembly within said bore, said bearing assembly having inner and outer races and antifriction elements therebetween, a shaft within said bearing assembly, means for rotating said shaft, transducer means between said bearing assembly and said housing for detecting forces caused by deflection of said shaft, and means for translating the detected deflection forces into the output torque of said shaft.

2. The device as defined in claim 1 wherein said shaft carries a gear in meshed relationship with a drive gear for imparting rotation to said shaft.

3. The device as defined in claim 1 wherein said transducer means includes at least a pair of strain gages, one of said strain gages being positioned for detecting compressive forces caused by shaft deflection, and the other of said strain gages being positioned for detecting tensile forces caused by shaft deflection.

4. The device as defined in claim 1 wherein said transducer means includes at least a pair of strain gages, and said translating means includes a circuit in which said strain gages define arms of a Wheatstone bridge.

5. The device as defined in claim 1 including means for supporting said transducer means within said housing, and said supporting means is a generally ring-like member.

6. The device as defined in claim 1 including means for supporting said transducer means within said housing, and said supporting means further supports said bearing assembly.

7. The device as defined in claim 1 including means for supporting said transducer means within said housing, said supporting means is a generally ring-like member, and said ring-like member supports therewithin said bearing assembly.

8. The device as defined in claim 1 including means for supporting said transducer means within said housing, said supporting means is a generally ring-like member, said ring-like member supports therewithin said bearing assembly, and said ring-like member is disposed in non-rotatable relationship relative to said housing.

9. The device as defined in claim 1 wherein said transducer means includes at least first means for detecting compressive forces caused by shaft deflection and second means for detecting tensile forces caused by shaft deflection.

10. The device as defined in claim 9 wherein said first and second detecting means define arms of a Wheatstone bridge forming at least in part said translating means.

11. The device as defined in claim 10 including means for supporting said first and second detecting means within said housing, and said supporting means is a generally ring-like member.

12. The device as defined in claim 11 wherein said bearing assembly is housed within said ring-like member.

13. The device as defined in claim 12 wherein said first detecting means is supported upon an exterior surface of said ring-like member and said second detecting means is supported upon an interior surface of said ring-like member.

14. The device as defined in claim 12 wherein said ring-like member has interior and exterior peripheral surfaces, and said first and second detecting means are supported upon the same peripheral surface.

15. The device as defined in claim 12 wherein said ring-like member has interior and exterior peripheral surfaces, and at least one of said peripheral surfaces are flattened to accommodate thereon at least one of said first and second detecting means.

16. The device as defined in claim 12 wherein said first and second detecting means each include a pair of detectors with each detector defining an arm of said Wheatstone bridge.

17. The device as defined in claim 16 wherein said ring-like member has interior and exterior peripheral surfaces, and said first and second detecting means are disposed on opposite ones of said peripheral surfaces.

18. The device as defined in claim 9 wherein said first and second detecting means each are defined by at least a pair of detectors.

19. The device as defined in claim 9 wherein said first and second detecting means each are defined by at least a pair of detectors, and said detectors each define an arm of a Wheatstone bridge forming at least in part said translating means.

* * * * *